(12) United States Patent
Liu et al.

(10) Patent No.: US 10,911,210 B2
(45) Date of Patent: Feb. 2, 2021

(54) TIME DIVISION DUPLEX (TDD) FULL DUPLEX (FDX) WITH A REMOTE DUTY CYCLE (DS) FRAMER

(71) Applicant: Cisco Technology, Inc., San Jose, CA (US)

(72) Inventors: Tong Liu, Acton, MA (US); John T. Chapman, Orange, CA (US); Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 50 days.

(21) Appl. No.: 16/258,196

(22) Filed: Jan. 25, 2019

(65) Prior Publication Data

US 2020/0244431 A1    Jul. 30, 2020

(51) Int. Cl.
*H04L 5/14* (2006.01)
*H04L 12/803* (2013.01)
*H04L 12/819* (2013.01)
*H04L 12/28* (2006.01)

(52) U.S. Cl.
CPC ............ *H04L 5/14* (2013.01); *H04L 12/2801* (2013.01); *H04L 47/125* (2013.01); *H04L 47/215* (2013.01)

(58) Field of Classification Search
CPC ..... H04L 5/14; H04L 47/215; H04L 12/2801; H04L 47/125
See application file for complete search history.

(56) References Cited

U.S. PATENT DOCUMENTS

| 10,616,126 | B2* | 4/2020 | Patrick | H04L 47/6215 |
| 2009/0154490 | A1* | 6/2009 | Diab | H04L 47/41 370/465 |
| 2012/0129543 | A1* | 5/2012 | Patel | H04L 65/4038 455/456.1 |
| 2014/0101711 | A1* | 4/2014 | Rakib | H04N 21/23605 725/129 |
| 2014/0199070 | A1* | 7/2014 | Shellhammer | H04Q 11/0067 398/66 |
| 2015/0172072 | A1* | 6/2015 | Rakib | H04L 12/2885 725/111 |
| 2017/0244577 | A1* | 8/2017 | Patrick | H04L 12/2801 |
| 2020/0053018 | A1* | 2/2020 | White | H04L 47/11 |
| 2020/0120041 | A1* | 4/2020 | Sun | H04L 47/80 |

* cited by examiner

*Primary Examiner* — Andrew Lai
*Assistant Examiner* — Mohammed M Murshid
(74) *Attorney, Agent, or Firm* — Merchant & Gould P.C.

(57) ABSTRACT

A system to support Time Division Duplex (TDD) Full Duplex (FDX) with a remote Duty Cycle (DS) framer may be provided. The system may comprise a core and a Remote PHY Device (RPD). The core may comprise a Downstream (DS) Quality-of-Service (QoS) scheduler and a DS duty cycle rate regulator. The DS duty cycle rate regulator may comprise a plurality of token buckets and a plurality of data framing queues. The RPD may comprise a plurality of TG queue blocks and switching logic.

19 Claims, 19 Drawing Sheets

| 0 | 4 | 8 | 16 | 31 |
|---|---|---|---|---|
| TG ID | FDX DS Chan | Change Count | DCD Frame Size (D3.0 Timestamp) | |
| DCD Start Time (D3.0 Timestamp) | | | | |
| DCD Frame Pattern: 1 = DS Off, 0 = DS On | | | | |

| Field | Definition |
|---|---|
| TG ID | Bits 0-3: Transmission Group ID |
| FDX DS Channel | Bits 4-7 With The Following Values: |
| | 0 = Applicable To All FDX DS Channels In The FDX Band |
| | 1, 2, 3 = FDX DS Channel Index |
| | Other Values Are Reserved |
| Change Count | Bits 8-15: Incremented By One When Duty Cycle Configuration Changes |
| DCD Frame Size | Bits 16-31:Number Of D3.0 Timestamps Equivalent To A DCD Frame Time Duration |
| DCD Start Time | 32 Bit D3.0 Timestamp That Specifies When The DCD Will Take Into Effect |
| DCD Frame Pattern | Bitmap For Repetitive On-Off DCD Frames (1 = DS Off; 0 = DS On) |

FIG. 9

TDD DS Logical Channel = A FDX DS
Channel With Duty Cycle Applied

TIME DIVISION DUPLEX (TDD) FULL DUPLEX (FDX) WITH A REMOTE DUTY CYCLE (DS) FRAMER

TECHNICAL FIELD

The present disclosure relates generally to Time Division Duplex (TDD) Full Duplex (FDX).

BACKGROUND

A system to support Time Division Duplex (TDD) Full Duplex (FDX) with a remote Duty Cycle (DS) framer may be provided. The system may comprise a CCAP Core (hereinafter referred to as core) and a Remote PHY Device (RPD). The core may comprise a Downstream (DS) Quality-of-Service (QoS) scheduler and a DS duty cycle rate regulator. The DS duty cycle rate regulator may comprise a plurality of token buckets and a plurality of DOCSIS External Downstream Interface (DEPI) data framing queues. The RPD may comprise a plurality of TG queue blocks and switching logic.

BRIEF DESCRIPTION OF THE FIGURES

The accompanying drawings, which are incorporated in and constitute a part of this disclosure, illustrate various embodiments of the present disclosure. In the drawings:

FIG. 9 illustrates a Duty Cycle Descriptor (DCD) message;

DETAILED DESCRIPTION

Overview

Figures 1, 2:
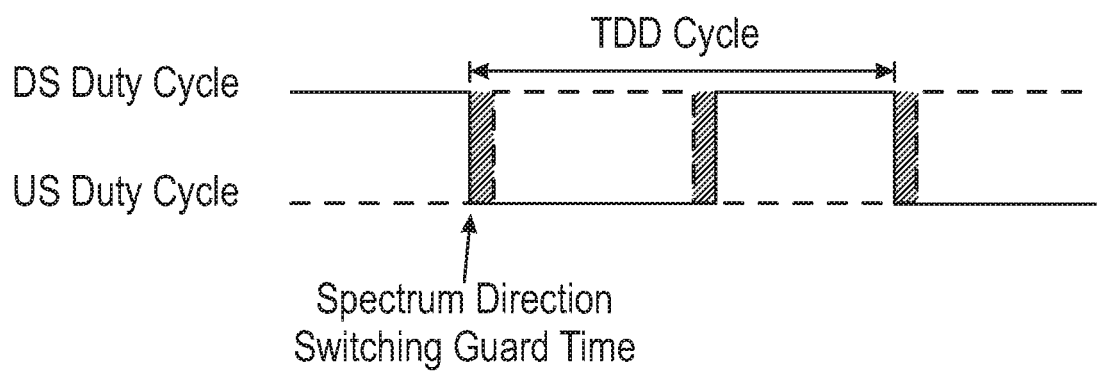
FIG. 1 illustrates an overview of the FDX spectrum resource block assignment (RBA)
FIG. 2 illustrates an overview of DS and US duty cycles as result of RBA changes in TDD operation.

A system to support Time Division Duplex (TDD) Full Duplex (FDX) with a remote Duty Cycle (DS) framer may be provided. The system may comprise a core and a Remote PHY Device (RPD). The core may comprise a Downstream (DS) Quality-of-Service (QoS) scheduler and a DS duty cycle rate regulator. The DS duty cycle rate regulator may comprise a plurality of token buckets and a plurality of DEPI data framing queues. The RPD may comprise a plurality of TG queue blocks and switching logic.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems. Fiber deep (FD) is a trend in which MSOs push fiber closer to customer premises equipment to provide users with better service. In order to facilitate FD, an optical Hybrid Fiber Cable (HFC) node comprising a Remote PHY Device (RPD) may be placed in a HFC network. As opposed to an amplifier, the RPD may receive signals from an MSO's headend via fiber optic cable rather than via coaxial cable for example. Accordingly, the optical HFC node comprising the RPD may be located at a junction of a fiber plant and a coaxial plant in the HFC network. In order to provide FD, many RPDs may be deployed in the HFC network.

A Cable Modem Termination System (CMTS) may provide high speed data services, such as cable Internet or Voice over Internet Protocol (VOIP) to users who may comprise MSO subscribers. Located in the MSO's headend, the CMTS may communicate with the RPD via fiber optic cable. The CMTS may be included in a Converged Cable Access Platform (CCAP) core. The CCAP core may control and setup data paths with multiple RPDs situated in multiple optical HFC nodes in the HFC network.

TDD Full Duplex (FDX) may be used in an RPD, however, it may present many challenges. For example, TDD FDX may require Downstream (DS) and Upstream (US) timing alignment at the Cable Modem (CM). TDD is transparent to the DS PHY device where DS signals are sent continuously over coax without a framing structure. Another challenge may be that imposing DS framing at the CCAP core may add timing ambiguity due to Convergent Interconnected Network (CIN) delay jitter. Also, TDD may need to ensure same level of Quality-of-Service (QoS) and system performance as existing FDD (Frequency Division Duplex).

TDD FDX may, however, provide many opportunities. For example, it may support TDD FDX HFC line extenders where the FDX band may be amplified in either the DS or the US direction at a time. In another example, it may improve resource block assignment (RBA) switching by providing full-band peak rate performance in both DS and US and by providing finer DS to US partition ratio than the static FDD.

FIG. 1 illustrates an overview of the FDX spectrum direction assignment Media Access Control (MAC) layer mechanism (i.e., RBA switching) that enables TDD. The FDX band may be divided into sub-bands and the CMTS may assign which sub-band(s) each CM Transmission Group (TG) is to use for US or DS operation. This assignment may be referred to as an RBA. Over time, RBA assigned to a TG may be switched among different sub-band direction combination options. RBA switching may be fast (e.g., at a time scale of single digit milliseconds or less), or slow (e.g., tens, hundreds of milliseconds). TDD may require fast RBA switching to avoid extended DS or US latency and may achieve finer DS to US bandwidth (b/w) partition ratio.

FIG. 2 illustrates an overview of DS and US duty cycles in TDD operation. As shown in FIG. 2, TDD results in DS and US duty cycles at per TG per sub-band basis (e.g., TDD FDX line extender assumes same duty cycle per TG across all sub-bands). The DS and US duty cycles perceived by the CM must be aligned with sufficient switching guard time (e.g., >=0.6 ms).

Figure 3:
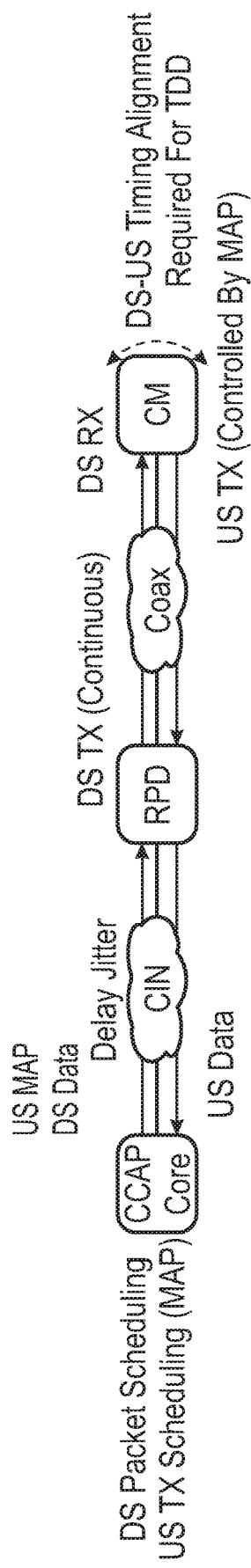
FIG. 3 shows TDD FDX system requirements in Remote PHY architecture.

FIG. 3 shows TDD FDX system requirements. The CMTS must ensure the DS and US duty cycles are aligned, despite the network jitter, with sufficient guard time for the CM to perform switching between directions. To provide efficiency, the guard time between the DS and the US perceived by the CM should be minimized to reduce efficiency loss. TDD adds latency variations (e.g., for a given direction, during the TDD off window, the queue may build up, during the on window, the queue will be drained). Shorter TDD cycle duration may be needed to avoid latency impact at the application layer. Skew is also a concern. For example, a TDD FDX DS channel may be bonded with the legacy FDD DS channels. The skew between the TDD FDX channels and the legacy FDD DS channels perceived by the CM must be less than the DSID resequencing wait time (e.g., provisioned based on buffer size, default at 13 ms).

Figure 4A:
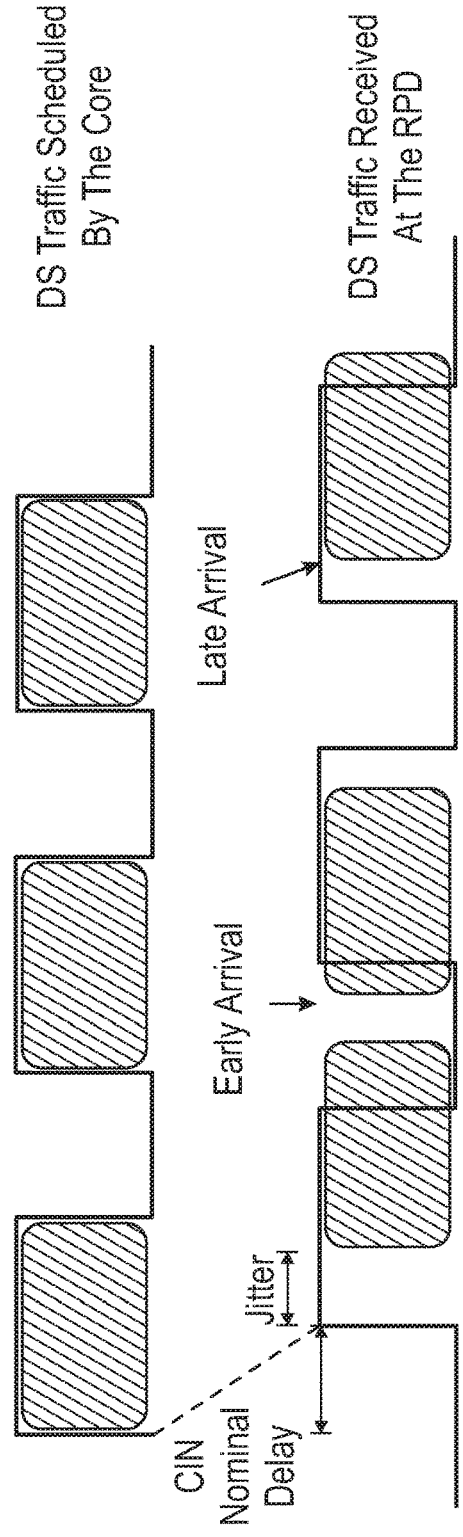
FIGS. 4A and 4B illustrate a conventional solution to support TDD FDX.
Figure 4B:
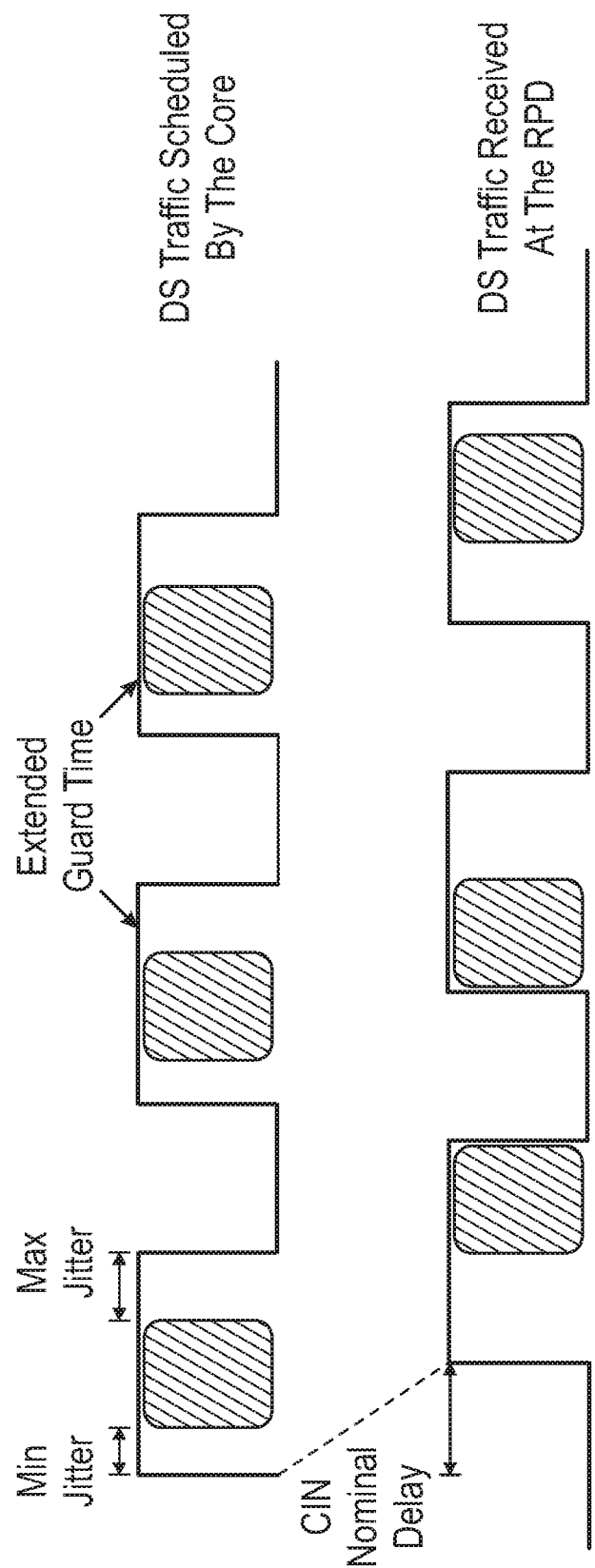

FIGS. 4A and 4B illustrate a conventional solution to support TDD FDX. FIG. 4A illustrates the issue of CIN delay jitter. FIG. 4B illustrates absorbing jitter with extended guard time. RPHY deployment context may comprise: i) the core DS scheduler frames the duty cycle by starting/stopping DS traffic in time; and ii) CIN delay jitter results in ambiguity in DS packet arrivals at the RPD (e.g., up to a few milliseconds). The conventional solution may be to absorb the delay jitter with an extended guard time (e.g., the CCAP DS scheduler stops DS traffic earlier and resumes the DS traffic later). However, this may cause issues with efficiency and latency. For example, extended guard time results in low spectrum efficiency (i.e., or low DS or US capacity per TG), especially when the TDD cycle is short with respect to the CIN delay jitter. Latency issues may occur because the extended guard time results in longer delay between active traffic windows.

Figure 5:
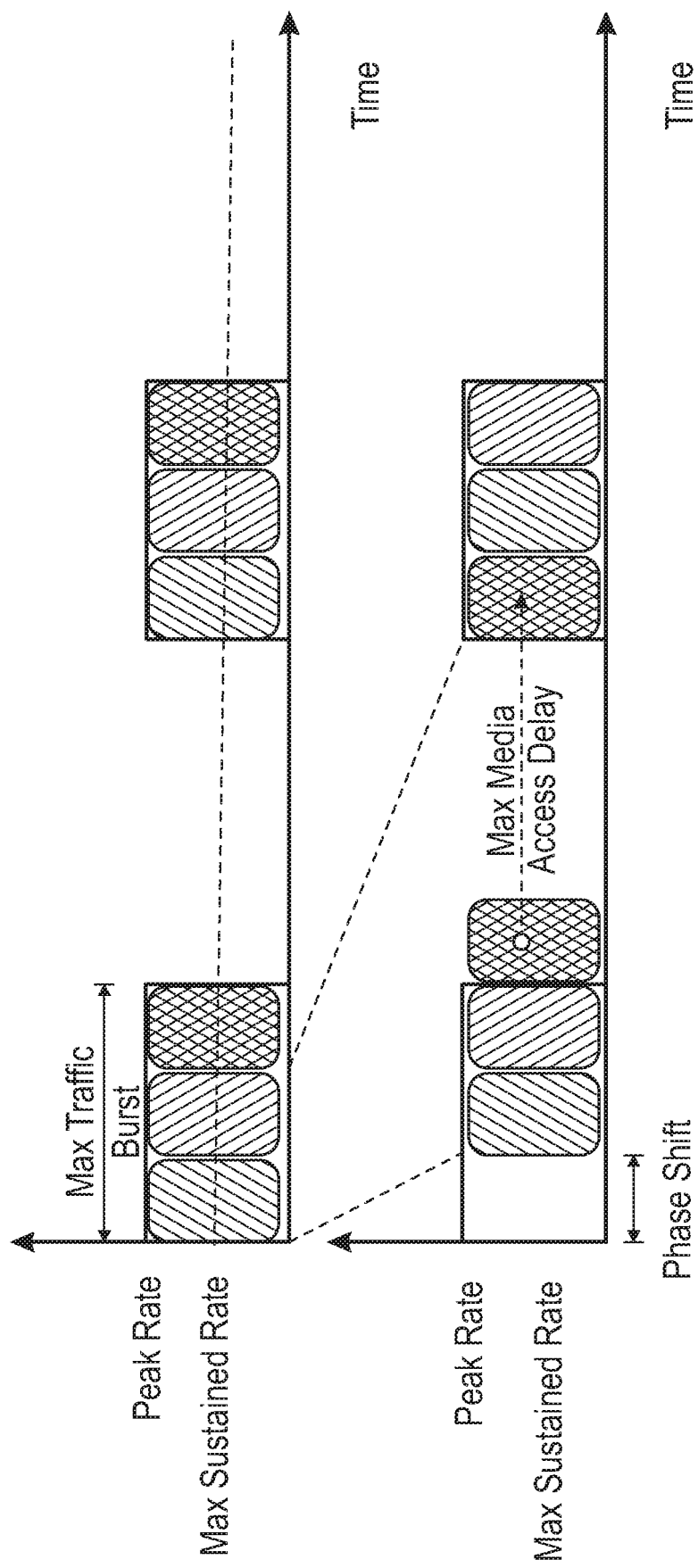
FIG. 5 illustrates what matters to traffic scheduling in TDD.

FIG. 5 illustrates what matters to traffic scheduling in TDD. For example, from a rate shaping point of view, duty cycle determines the DS traffic peak rate and maximum sustained rate per TG. For a latency point of view, duty cycle determines the maximum media access delay, and duration of the max traffic burst. The duty cycle phase shift between the core and the RPD may result in delay variation of individual packet.

Figure 6:
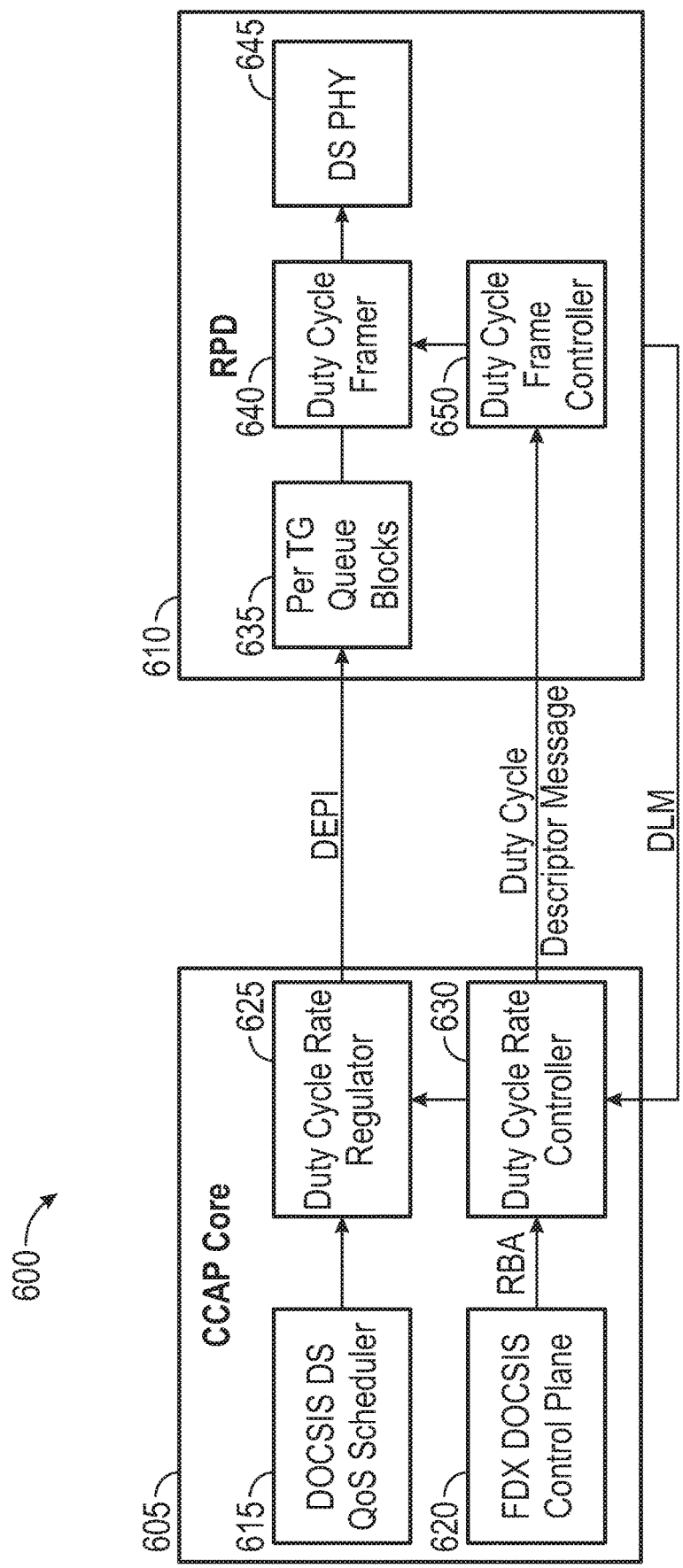
FIG. 6 is a block diagram of system to support Time Division Duplex (TDD) Full Duplex (FDX)

FIG. 6 is a block diagram of system 600 to support Time Division Duplex (TDD) Full Duplex (FDX). As shown in FIG. 6, system 600 may comprise a core 605 (e.g., a CCAP core) and an RPD 610. Core 605 may comprise a Data Over Cable Service Interface Specification (DOCSIS) DS Quality-of-Service (QoS) scheduler 615, an FDX DOCSIS control plane 620, a duty cycle rate regulator 625, and a duty cycle rate controller 630. RPD 610 may comprise per TG queue blocks 635, a duty cycle framer 640, a DS PHY device 645, and a duty cycle frame controller 650.

Elements of system 600 (e.g., core 605, RPD 610, DOCSIS DS QoS scheduler 615, FDX DOCSIS control plane 620, duty cycle rate regulator 625, duty cycle rate controller 630, per TG queue blocks 635, duty cycle framer 640, DS PHY device 645, and duty cycle frame controller 650) may be practiced in hardware and/or in software (including firmware, resident software, micro-code, etc.) or in any other circuits or systems. The elements of system 600 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 600 may also be practiced using other technologies capable of performing logical operations such as, for example, AND, OR, and NOT, including but not limited to, mechanical, optical, fluidic, and quantum technologies. As described in greater detail below with respect to FIG. 19, the elements of system 600 may be practiced in a computing device 1900.

Consistent with embodiments of the disclosure, system 600 may separate DS duty cycle rate shaping from duty cycle framing. This may add forwarding modules between DS QoS scheduler 615 and DS PHY device 645 with no change required to the DS QoS scheduler or the DS PHY. Duty cycle rate regulator 625 may be implemented after DS QoS scheduler 615 at core 605. Duty cycle framer 640 may be implemented at RPD 610 between an RPD DOCSIS External PHY Interface (DEPI) interface and a DS PHY DEPI interface. A control plane module may translate RBAs into duty cycles for both rate limiting at core 605 and duty cycle framing at RPD 610. The duty cycle applied at core 605 leads the duty cycle applied at RPD 610 by a nominal CIN delay (e.g., based on existing DEPI latency measurement feature). Remote DS duty cycle framer may be implemented in at least two embodiments, one embodiment may have only remote duty cycle framing and another embodiment that may have remote duty cycle framing with remote load balancing at RPD 610.

For the embodiments with only remote duty cycle framing, full DS QoS control may be retained at core 605. This may include one of the following deployment restrictions such that DS QoS may not be impacted by delay variation of individual packet caused by the duty cycle phase shift:
 i) No DS channel bonding between the TDD FDX DS channel and the legacy FDD DS channels.
 ii) If a TDD FDX DS channel is bonded with the legacy FDD DS channels, the TDD duty cycle may need to be short enough such that any packet blocked by the DS off window in the TDD DS channel will not cause the bonding skew violation at the FDX CM.
 iii) The FDX CM may have more resequencing buffers that may tolerate longer bonding skew.

For the embodiment that may have remote duty cycle framing with remote load balancing at RPD 610, load balancing at RPD 610 may be required if the duty cycle phase shift results in skew violation between a TDD FDX DS channel and the legacy FDD DS channel. However adding remote load balancing may increase RPD implementation complexity, which may also be constrained by RPD 610's power budget and computation capacity.

Figure 7:
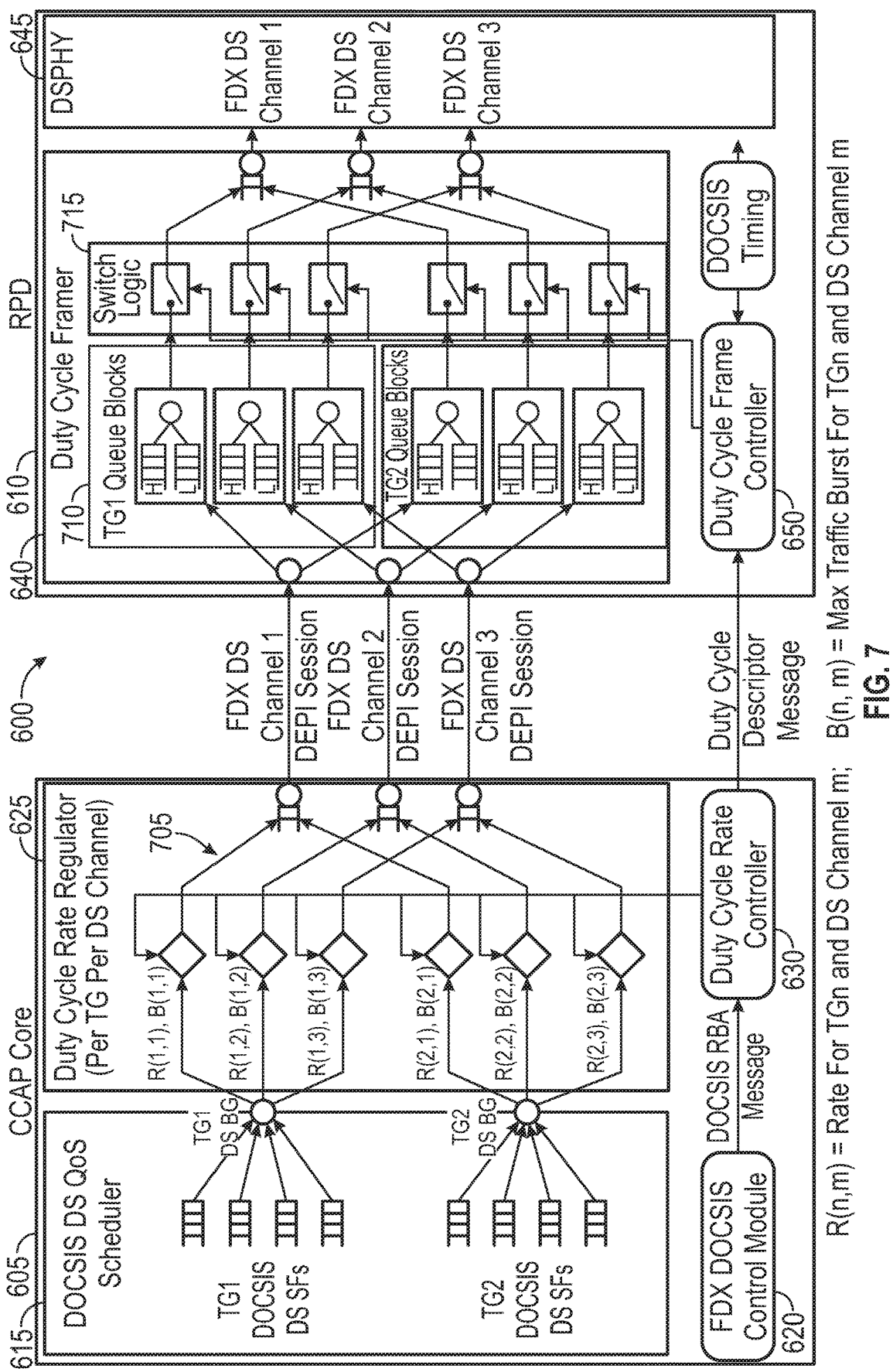
FIG. 7 shows system in more detail.

FIG. 7 shows system 600 in more detail. As shown in FIG. 7, DS duty cycle rate regulator 625 may contain a plurality of token buckets 705, located between DS QoS scheduler 615 and an FDX DS channel DEPI encoder. The DS QoS scheduler 615 may distribute the FDX DS bandwidth resource assigned to a TG among member DS service flows (SF) sharing a BG that covers the FDX spectrum. DS QoS scheduler 615 may be unaware of the RBA assignment. A given TG's FDX DS bandwidth resource may be impacted by the duty cycle on-off ratio on each FDX channel. A token bucket may be applied per FDX DS channel per TG with tokens filled based on the DS duty cycle. Data conformed to the duty cycle rate limit may be forwarded to the DEPI data framing queue of the corresponding FDX DS channel. DS QoS scheduler 615 may pick the channel with most tokens to forward a packet. When tokens are depleted on a DS channel within a TG, no packet from the TG may be sent to that channel.

As shown in FIG. 7, DS duty cycle framer 640 may be located at RPD 610 on the DEPI path between the network interface and DS PHY device 645. DS duty cycle framer 640 may contains a per TG queue blocks 710 and a switch logic 715 controlled by the duty cycle. DEPI data frames received from the network interface are enqueued to per TG queue block 710 based on the TG ID encoded in the DEPI header. Within each queue block, DEPI frames are queued per Packet Streaming Protocol (PSP) per channel. High priority PSP flows will be dequeued first on each channel when a duty cycle starts. Switch logic 715 may contain per TG per channel switches. Each switch may be controlled independently based on the duty cycle timing retrieved from the duty cycle frame descriptor over the control plane.

Figure 8:
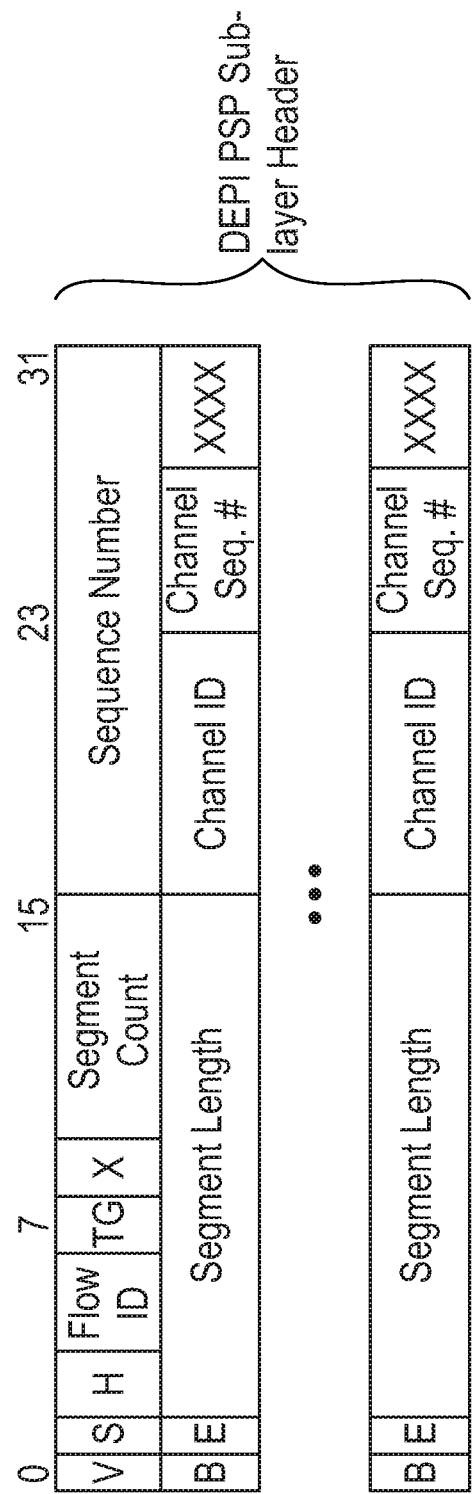
FIG. 8 illustrates DEPI channel ID to TD ID mapping.

FIG. 8 illustrates DEPI channel ID to TD ID mapping. As shown in FIG. 8, the TG bit, my comprise, but is not limited to, Bit 7 (currently a reserved bit) in the first 32 bit word of the PSP Sub-layer header for example. If the TG bit is set, the 8-bit "Channel ID" field is encoded as follows: bit 7-4:TG ID; bit 3-0:channel ID. If the TG bit is not set, the entire "Channel ID" field is encoded as the channel ID.

FIG. 9 illustrates a Duty Cycle Descriptor (DCD) message. As shown in FIG. 9, the DCD message describes the DS duty cycle on an FDX DS channel. When DCD configuration changes, core 605 may update the DCD and send it to RPD 615 in advance with a guaranteed DCD lead time: DCD lead time=Max CIN delay+DCD Processing Time at the RPD.

Figure 10:
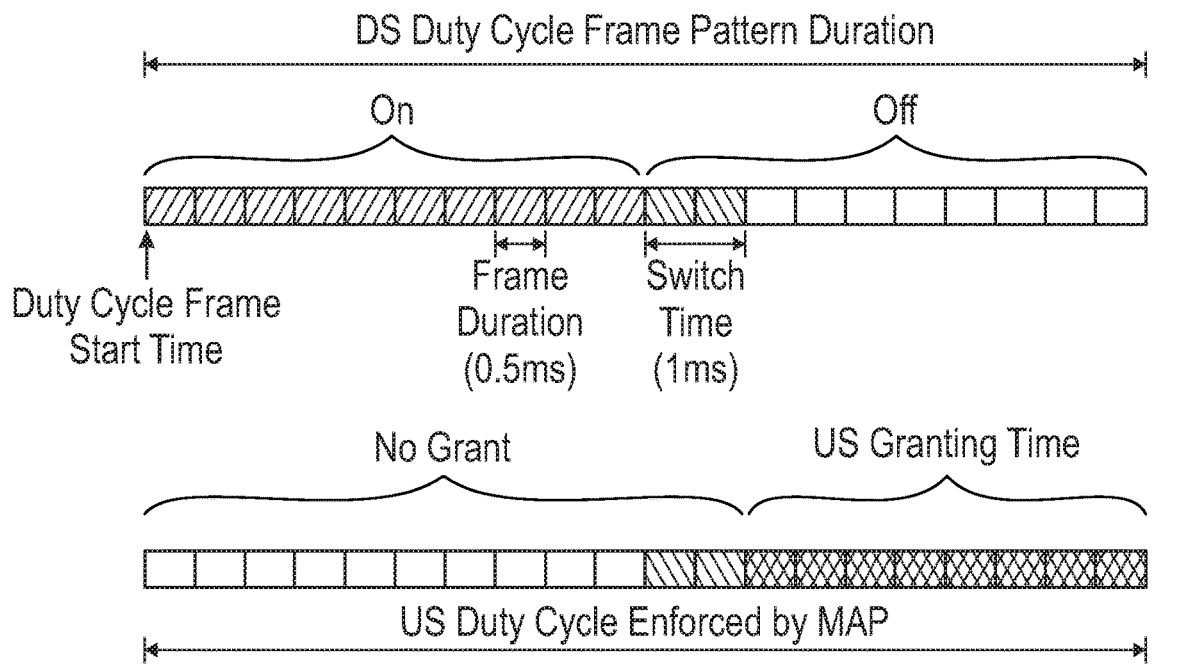
FIG. 10 illustrates DS and US alignment in TDD.

FIG. 10 illustrates DS and US alignment in TDD. As shown in FIG. 10, to support TDD, core 605 aligns the DS duty cycle with MAPs in the US channels occupying the same FDX spectrum per TG. The example in FIG. 10 illustrates a DS and US alignment instance in TDD operation.

Figure 11:
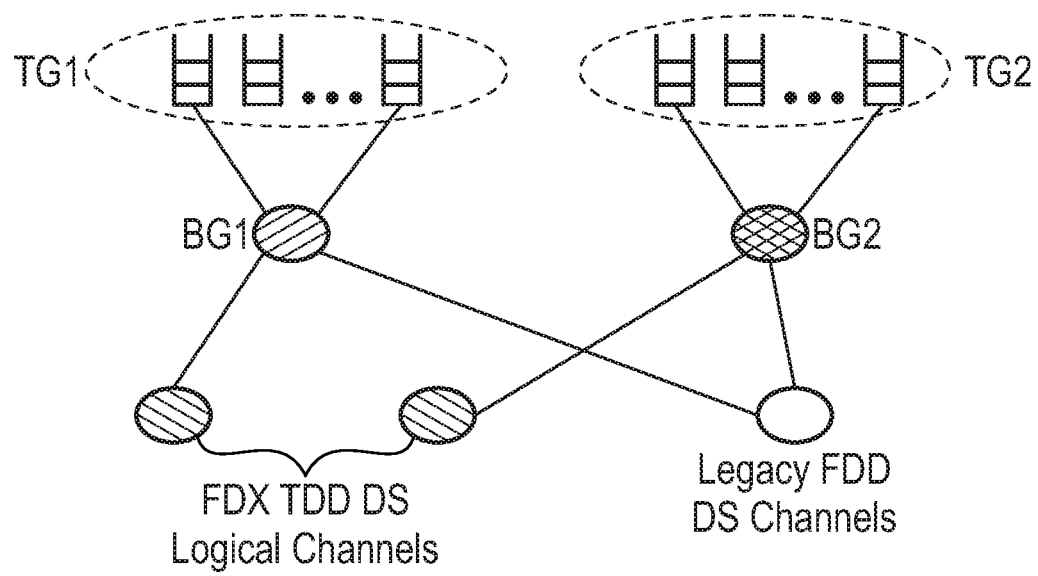
FIG. 11 illustrates TDD DS bonding group (BG) sharing RF channels.
Figure 12:
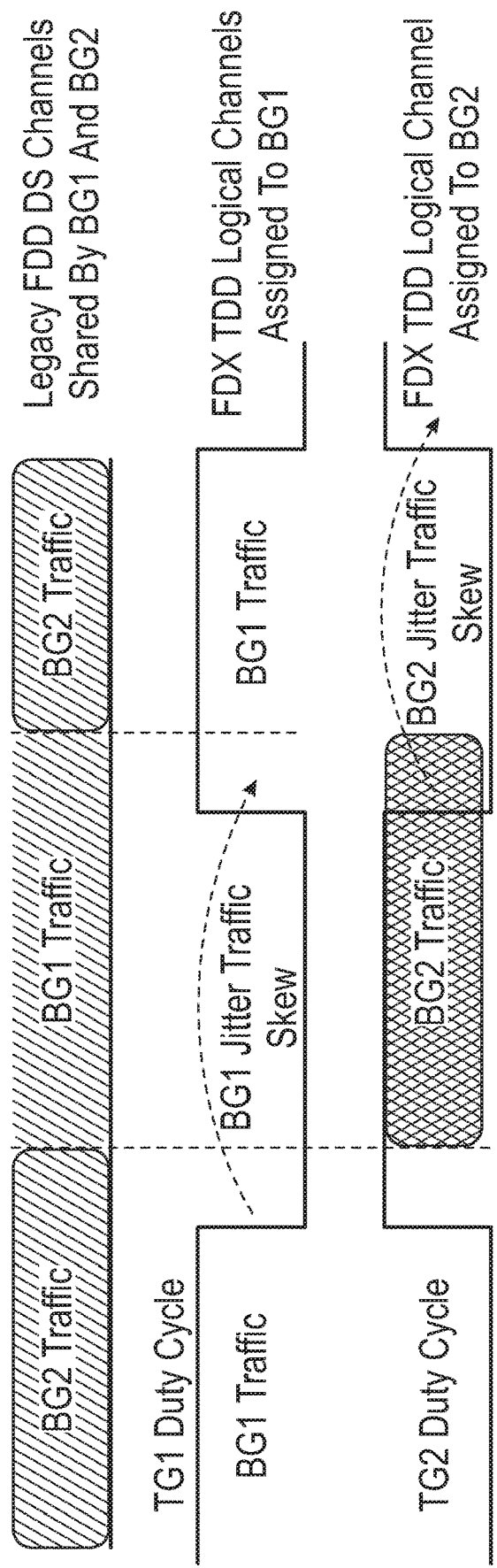
FIG. 12 illustrates TDD impact on DS bonding skew.

TDD may have an impact on DS bonding skew. As shown in FIG. 11 bonding groups (BGs) assigned to different TGs may overlap and share the same set of legacy FDD DS channels. Core 605 performs load balancing to minimize the forwarding skew across different RF channels. As shown in FIG. 12, with remote duty cycle framing, the jitter traffic (e.g., caused by the CIN delay jitter) received in an FDX TDD channel may need to be queued before the duty cycle becomes active. If the duty cycle is not short enough, the extra queue delay experienced by the jitter traffic may result in the DS bonding skew violation at the CM.

Figure 13A:
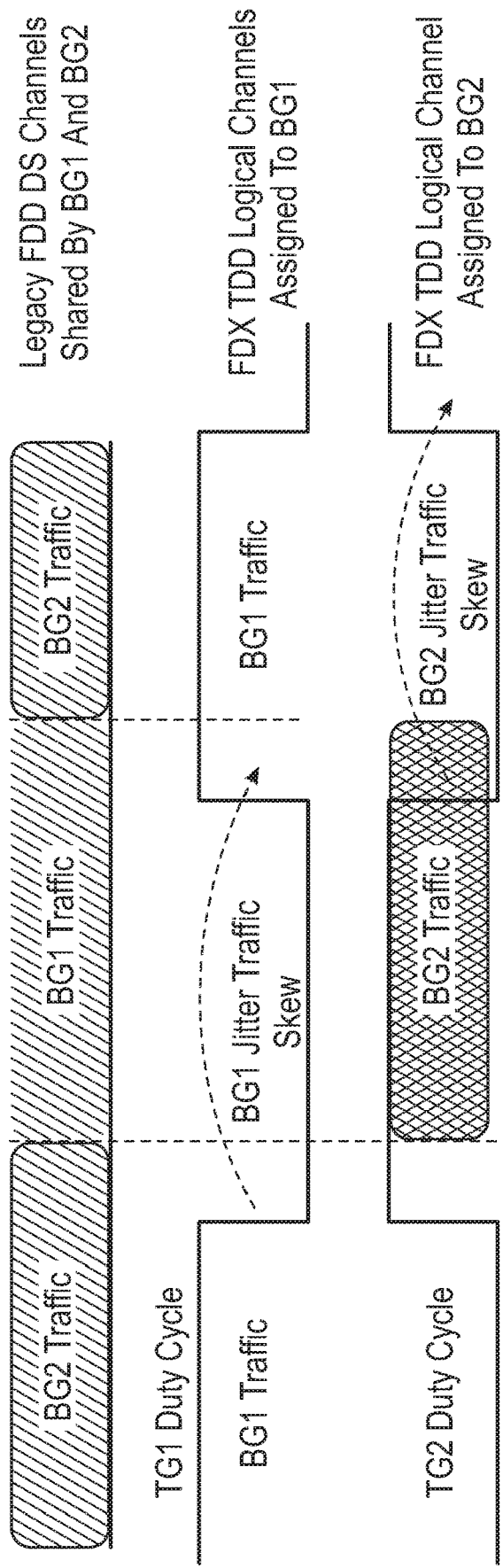
FIGS. 13A, 13B, and 13C illustrate avoiding skew with load balancing at RPD.
Figure 13B:
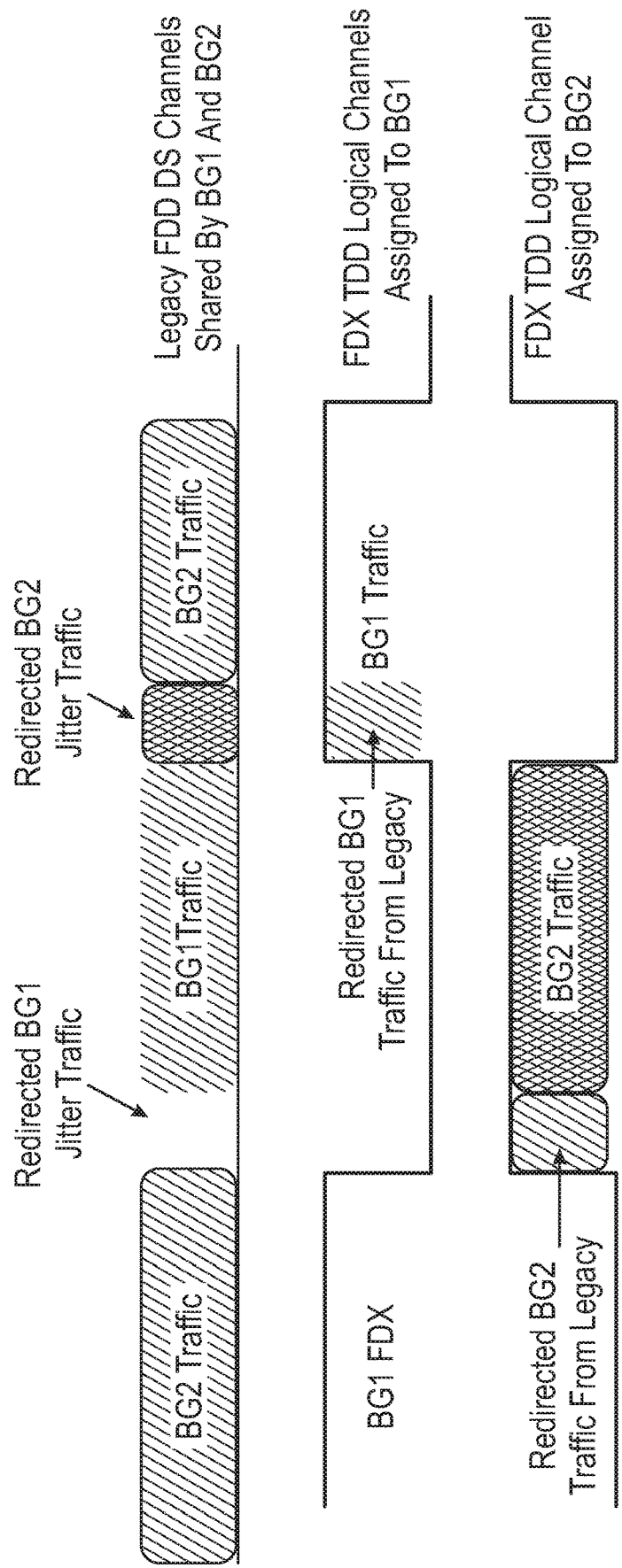
Figure 13C:
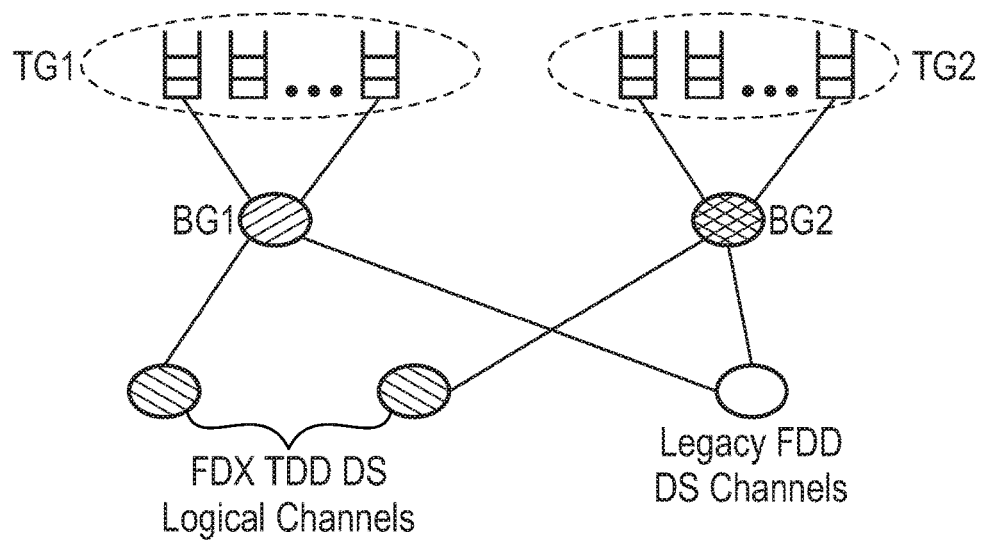

FIGS. 13A, 13B, and 13C illustrate avoiding skew with load balancing at RPD 610. Load balancing at RPD 610 allows the jitter traffic blocked by the TDD duty cycle to be drained by the legacy FDD DS channels. For example, TG1 and TG2 have opposite DS duty cycles on FDX channels to maximize FDX spectrum utilization. During TG1's off-window, BG1 jitter will be drained by the legacy DS channels. Saturation on the legacy DS channels, may push BG2 traffic to TG2's FDX TDD channel during its on-window.

Figure 14:
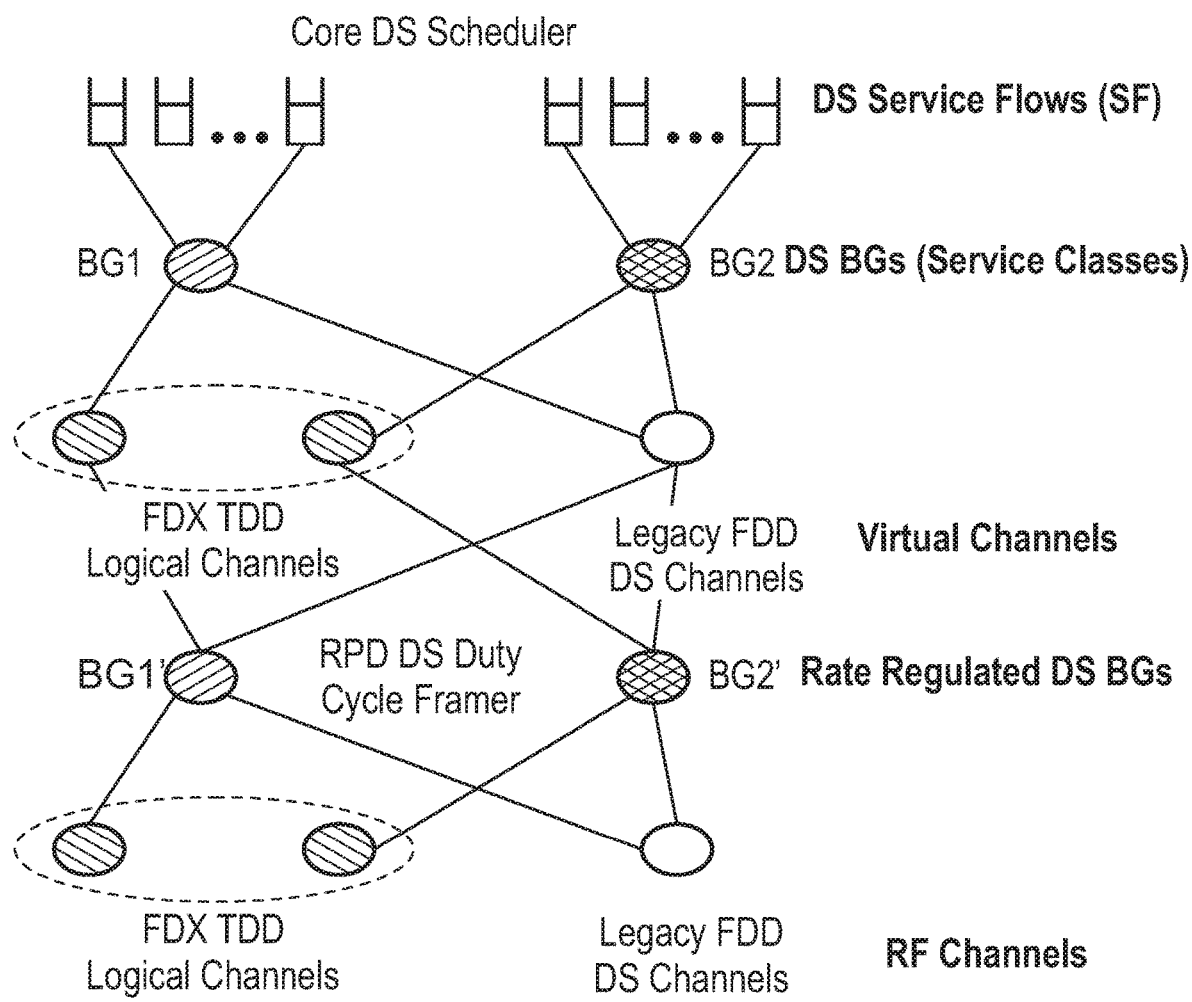
FIG. 14 illustrates a DS QoS model with load balancing at RPD DS duty cycle framer.

FIG. 14 illustrates a DS QoS model with load balancing at RPD DS duty cycle framer 640. As shown in FIG. 14, DOCSIS DS QoS scheduler 615 may achieve: i) DOCSIS DS SF QoS; and ii) per BG rate limiting and fairness based on RF channels' (including TDD logical channels) peak and average rates. RPD DS duty cycle framer 640 may achieve: i) duty cycle timing enforcement; and ii) balanced RF channel utilization (minimized skew across RF channels).

Figure 15A:
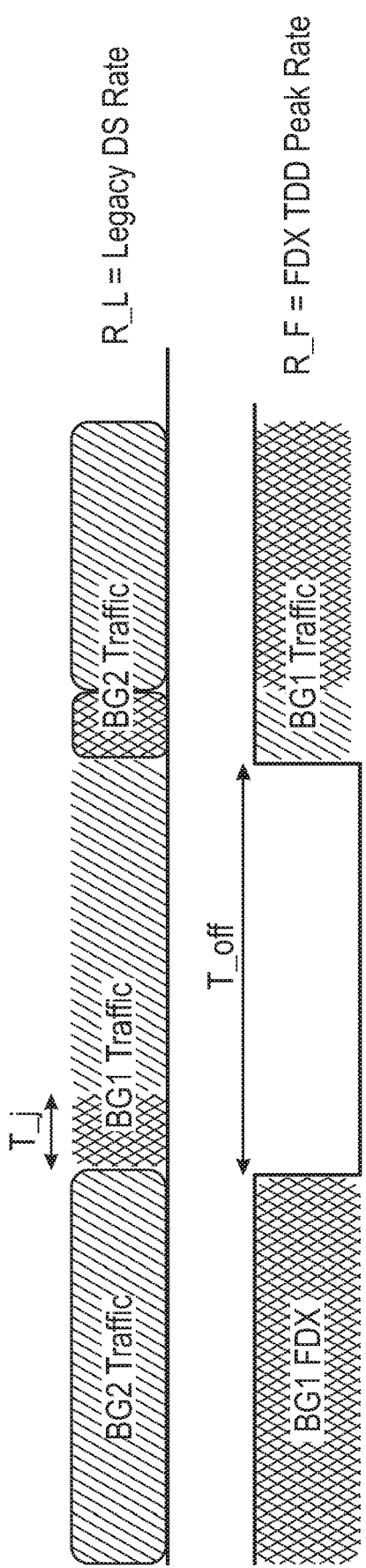
FIGS. 15A and 15B illustrate legacy spectrum skew absorbing capability.
Figure 15B:
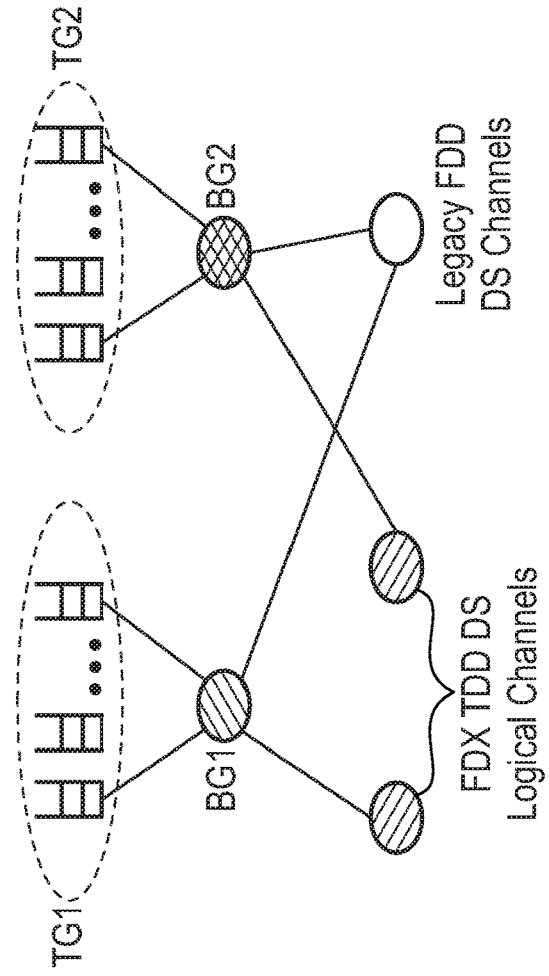

FIGS. 15A and 15B illustrate legacy spectrum skew absorbing capability. As shown in FIGS. 15A and 15B, legacy spectrum jitter absorbing capability (to drain the jitter traffic when TDD FDX channel is at the off-state) may comprise $T_j=T\_off*R\_L/R\_F$. If the max CIN delay jitter is great than $T_j$, per BG buffering may be required at RPD 610. To avoid SF QoS degradation, extra buffering per BG at RPD needs to be minimized.

Figure 16:
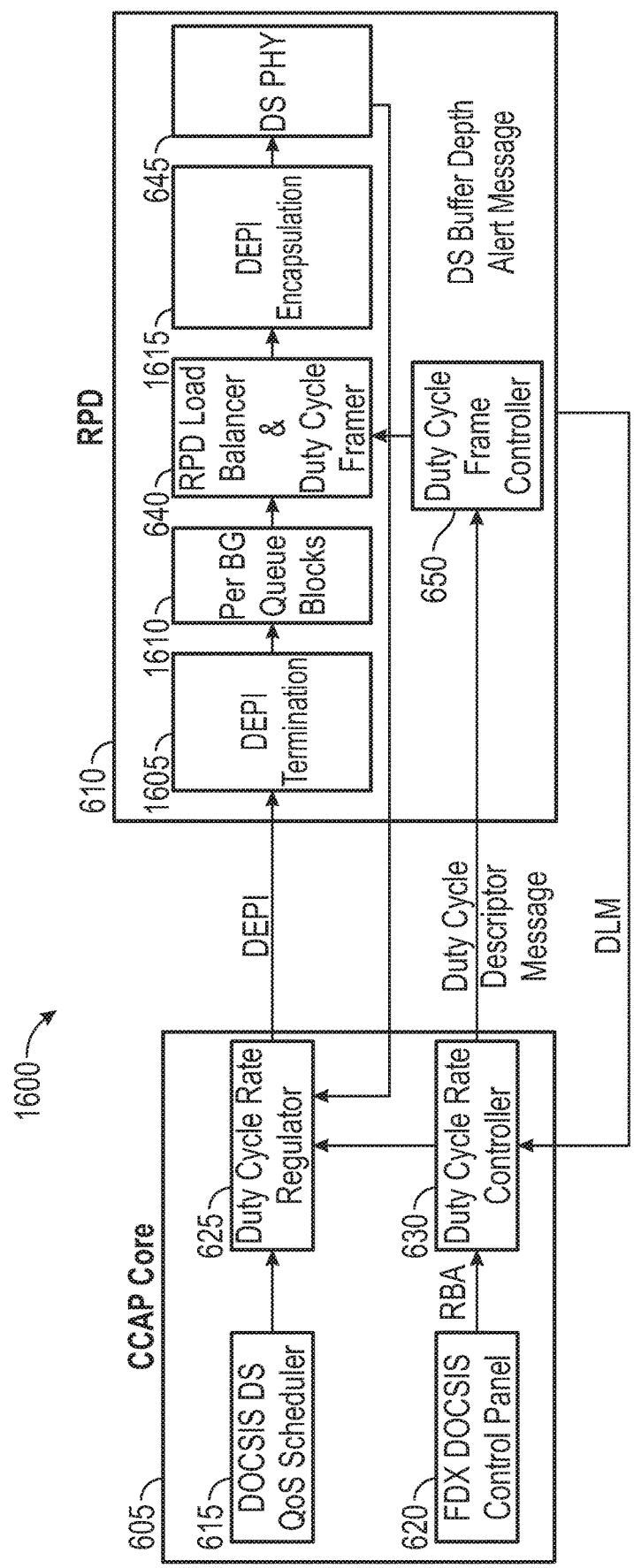
FIG. 16 illustrates an embodiment that may have remote duty cycle framing with remote load balancing at RPD.

FIG. 16 illustrates embodiments that may have remote duty cycle framing with remote load balancing at RPD 610. The system 1600 of FIG. 16 is similar to system 600 of FIG. 6, however, system 1600 includes DEPI termination 1605, per BG queue blocks 1610, and DEPI encapsulation 1615. System 1600 includes extra logic at core 605 and RPD 610 that includes per DEPI data session that adds a new BG sub-channel to transport DS traffic per DS bonding context (e.g., RF channel and data profile used per packet). Extra logic at RPD 610 may comprise DEPI termination 1605 that may terminate DEPI for packet load balancing. An RPD load balancer may be included in duty cycle framer 640 to balance traffic to RF channels based on the DS bonding context, TDD duty cycle, and PHY DS buffer depth alert. DEPI encapsulation 1615 may encapsulate per RF channel DEPI frames to interface DS PHY device 645.

Figure 17:
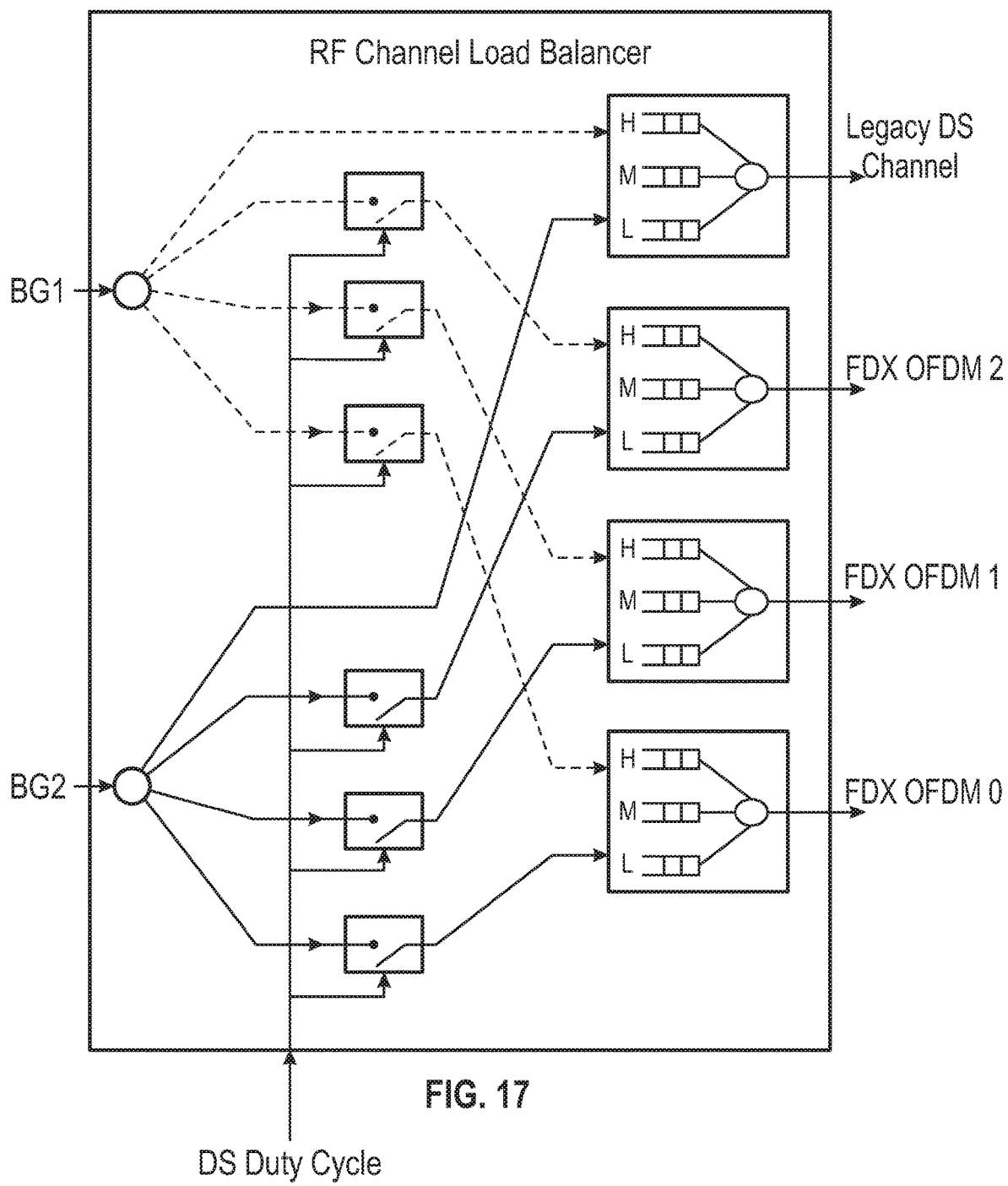
FIG. 17 illustrates an RPD load balancer may be included in duty cycle framer.

FIG. 17 illustrates RPD load balancer 1700 that may be included in duty cycle framer 640. As shown in FIG. 17, a packet received on a DS SF has a bonding context (e.g., RF channel set, modulation profiles). RPD load balancer 1700 may calculate per packet forwarding latency on each bonded RF channel based on queue depth, modulation rate, and duty cycle framing. The RF channel with the least forwarding latency is selected to enqueue the packet. Multiple queues per RF channel may be used to differentiate traffic priorities. Same load balancing logic is used at both core 605 (e.g., for rate limiting) and RPD 610 (e.g., for duty cycle framing). The core duty cycle leads the RPD duty cycle with a nominal CIN delay.

Figure 18:
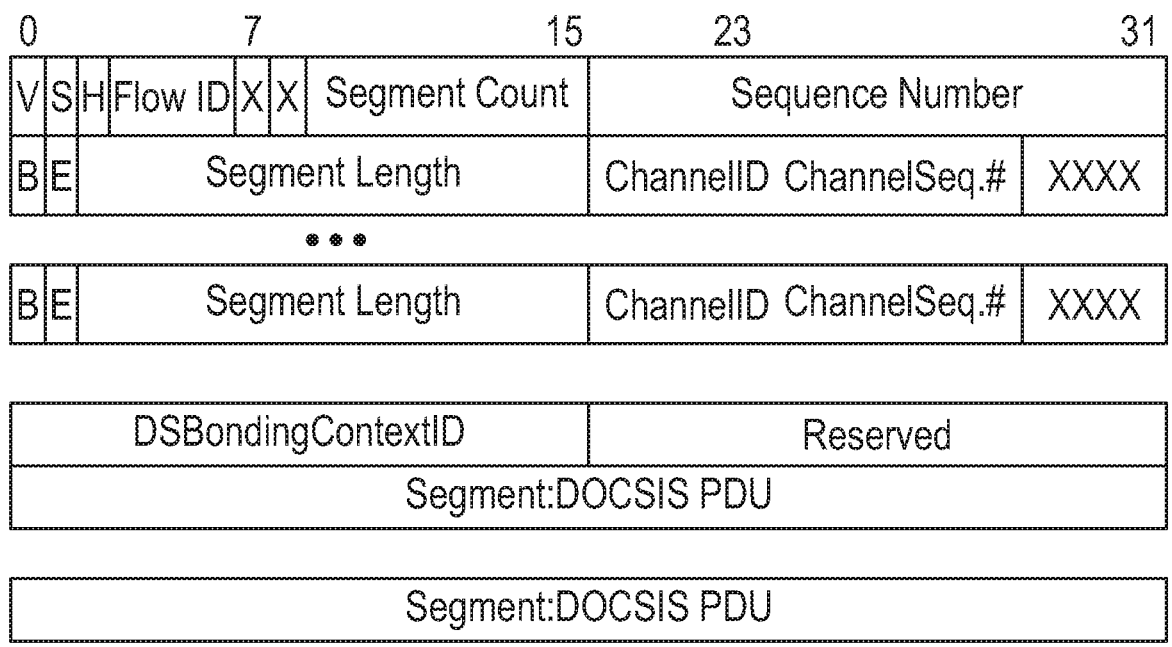
FIG. 18 illustrates DEPI Packet Streaming Protocol (PSP) sub-layer for BG sub-channel.

FIG. 18 illustrates DEPI Packet Streaming Protocol (PSP) sub-layer for BG sub-channel, a new PSP sub-channel type that may be added to existing SCQAM and OFDM DEPI data sessions. As shown in FIG. 18, the first 16 bits of the 1st segment contains a DS Bonding Context ID common to all segments in the PSP PDU. A segment belongs to a different DS Bonding Context ID may be put into a different PSP PDU. RPD 610 may use the DS Bonding Context ID to get the bonding context containing the RF channel set and the corresponding data modulation profiles. A DS Bonding context may be shared by multiple SFs. A DS Bonding Context is provisioned by the Core through control plane.

Figure 19:
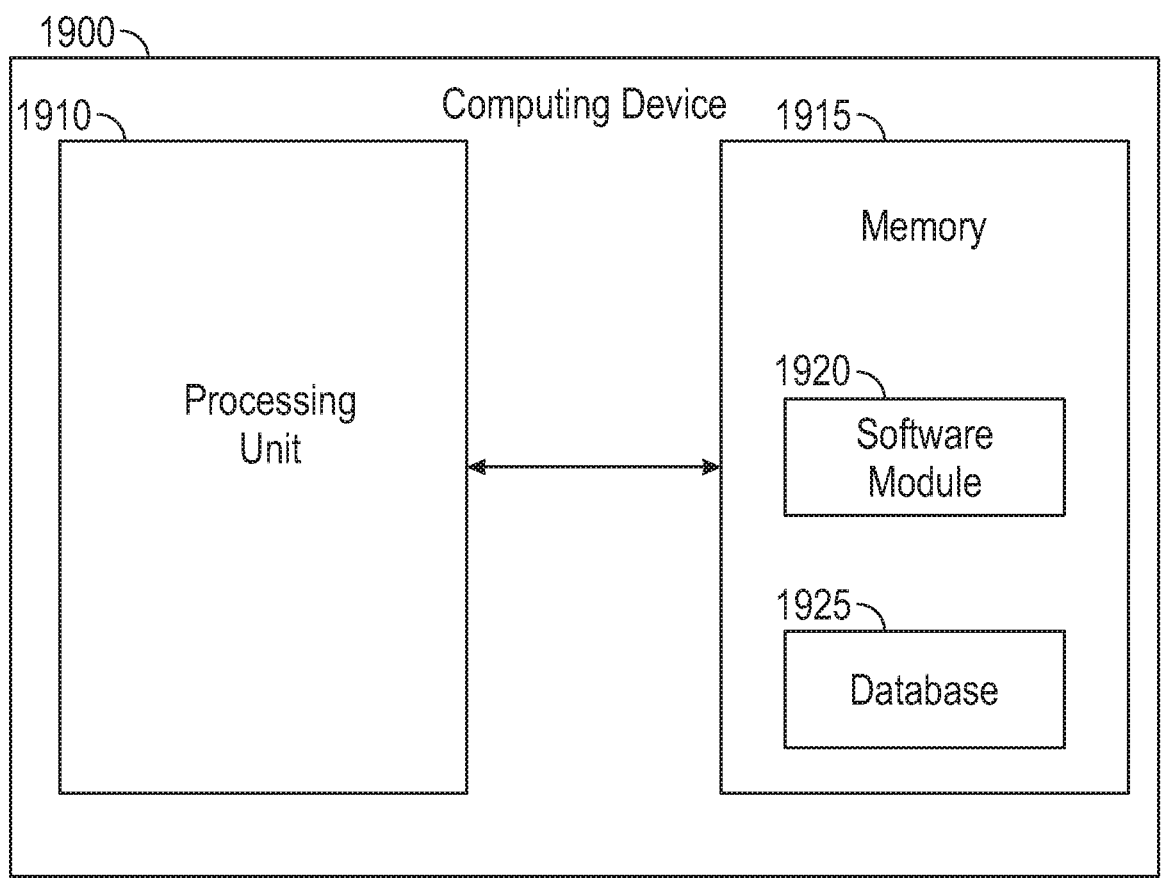
FIG. 19 is a block diagram of a computing device.

FIG. 19 shows computing device 1900. As shown in FIG. 19, computing device 1900 may include a processing unit 1910 and a memory unit 1915. Memory unit 1915 may include a software module 1920 and a database 1925. While executing on processing unit 1910, software module 1920 may perform, for example, processes to support Time Division Duplex (TDD) Full Duplex (FDX) with a remote Duty Cycle (DS) framer described above. Computing device 1900, for example, may provide an operating environment for core 605, RPD 610, DOCSIS DS QoS scheduler 615, FDX DOCSIS control plane 620, duty cycle rate regulator 625, duty cycle rate controller 630, per TG queue blocks 635, duty cycle framer 640, DS PHY device 645, duty cycle frame controller 650, DEPI termination 1605, per BG queue blocks 1610, and DEPI encapsulation 1615. Core 605, RPD 610, DOCSIS DS QoS scheduler 615, FDX DOCSIS control plane 620, duty cycle rate regulator 625, duty cycle rate controller 630, per TG queue blocks 635, duty cycle framer 640, DS PHY device 645, duty cycle frame controller 650, DEPI termination 1605, per BG queue blocks 1610, and DEPI encapsulation 1615 may operate in other environments and are not limited to computing device 1900.

Computing device 1900 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 1900 may comprise any computer operating environment, such as hand-held devices, multiprocessor systems, microprocessor-based or programmable sender electronic devices, minicomputers, mainframe computers, and the like. Computing device 1900 may also be practiced in distributed computing environments where tasks are performed by remote processing devices. The aforementioned systems and devices are examples and computing device 1900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 6 and FIG. 16 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 1900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   a core comprising,
      a Downstream (DS) Quality-of-Service (QoS) scheduler configured to distribute a Full Duplex (FDX) DS bandwidth resource assigned to a Transmission Group (TG) among member DS service flows (SF) sharing a Bonding Group (BG) that covers the FDX spectrum and
      a DS duty cycle rate regulator comprising,
         a plurality of token buckets wherein each one of the plurality of token buckets respectively corresponds to each one of a plurality of FDX DS channels assigned to the TG, wherein the plurality of token buckets are filled based on a Time Division Duplex (TDD) DS duty cycle and a modulation profile in use, and
         a plurality of Data Over Cable Service Interface Specification (DOCSIS) External PHY Interface (DEPI) data framing queues wherein each one of the plurality of DOCSIS DEPI data framing queues respectively corresponds to each one of the plurality of FDX DS channels, wherein the DS QoS scheduler forwards packets to a one of the plurality of DEPI data framing queues corresponding to a one of the plurality of FDX DS channels that has the most tokens in its corresponding token bucket; and
   a Remote PHY Device (RPD) comprising a DS duty cycle framer comprising;
      a plurality of TG queue blocks corresponding to the TG wherein the plurality of TG queue blocks are configured to enqueue DEPI frames based on a TG ID encoded in a header of the DEPI frames, and
      switching logic connecting the plurality of TG queue blocks to Radio Frequency (RF) channels based on duty cycle timing retrieved from a Duty Cycle Descriptor (DCD) message received from the core over a control plane.

2. The system of claim 1, wherein the plurality of token buckets are located between the DS QoS Scheduler and an FDX DS channel DEPI encoder.

3. The system of claim 1, wherein within each the plurality of TG queue blocks, the DEPI frames are queued per Packet Streaming Protocol (PSP) per channel wherein higher priority PSP flows are dequeued first on each channel when a duty cycle starts before lower priority PSP flows are dequeued.

4. The system of claim 1, wherein the DS duty cycle framer is located at the RPD on a DEPI path between a network interface and a DS PHY device.

5. The system of claim 1, wherein the core is configured to update the DCD and send it to the RPD in advance with a guaranteed DCD lead time when the DCD configuration changes.

6. The system of claim 1, wherein the core comprises a Convergent Cable Access Platform (CCAP) core.

7. The system of claim 1, wherein the core is configured to align the DS duty cycle with MAPs in US channels occupying a same FDX spectrum per TG.

8. The system of claim 1, further comprising a Bonding Group (BG) sub-channel per DEPI data session configured to transport DS traffic per DS bonding context comprising RF channel and data profile used per packet.

9. The system of claim 1, wherein the RPD further comprises a DEPI termination device configured to terminate DEPI for packet load balancing.

10. The system of claim 1, wherein the RPD further comprises an RF channel load balancer configured to balance traffic to the RF channels based on the DS bonding context, TDD duty cycle, and PHY DS buffer depth alerts.

11. A system comprising a core comprising,
   a Downstream (DS) Quality-of-Service (QoS) scheduler configured to distribute a Full Duplex (FDX) DS bandwidth resource assigned to a Transmission Group (TG) among member DS service flows (SF) sharing a Bonding Group (BG) that covers the FDX spectrum; and
   a DS duty cycle rate regulator comprising,
      a plurality of token buckets wherein each one of the plurality of token buckets respectively corresponds to each one of a plurality of FDX DS channels assigned to the TG, wherein the plurality of token buckets are filled based on a Time Division Duplex (TDD) DS duty cycle and a modulation profile in use, and
      a plurality of Data Over Cable Service Interface Specification (DOCSIS) External PHY Interface (DEPI) data framing wherein each one of the plurality of DOCSIS DEPI data framing queues respectively corresponds to each one of the plurality of FDX DS channels, wherein the DS QoS scheduler forwards packets to a one of the plurality of DEPI data framing queues corresponding to a one of the plurality of FDX DS channels that has the most tokens in its corresponding token bucket.

12. The system of claim 11, wherein the plurality of token buckets are located between the DS QoS Scheduler and an FDX DS channel DEPI encoder.

13. The system of claim 11, wherein the core comprises a Convergent Cable Access Platform (CCAP) core.

14. The system of claim 11, wherein the core is configured to align the DS duty cycle with MAPs in US channels occupying a same FDX spectrum per TG.

15. The system of claim 11, further comprising a Bonding Group (BG) sub-channel per DEPI data session configured to transport DS traffic per DS bonding context comprising RF channel and data profile used per packet.

16. A system comprising a Remote PHY Device (RPD) comprising a DS duty cycle framer comprising:
   a plurality of Transmission Group (TG) queue blocks corresponding to a TG wherein the plurality of TG queue blocks are configured to enqueue DOCSIS External PHY Interface (DEPI) frames based on a TG ID encoded in a header of the DEPI frames; and
   switching logic connecting the plurality of TG queue blocks to Radio Frequency (RF) channels based on duty cycle timing retrieved from a Duty Cycle Descriptor (DCD) message received from a core over a control plane
   wherein within each the plurality of TG queue blocks, the DEPI frames are queued per Packet Streaming Protocol (PSP) per channel wherein higher priority PSP flows are dequeued first on each channel when a duty cycle starts before lower priority PSP flows are dequeued.

17. The system of claim 16, further comprising a Bonding Group (BG) sub-channel per DEPI data session configured to transport DS traffic per DS bonding context comprising RF channel and data profile used per packet.

18. The system of claim 16, wherein the RPD further comprises a DEPI termination device configured to terminate DEPI for packet load balancing.

19. The system of claim 16, wherein the RPD further comprises an RF channel load balancer configured to balance traffic to the RF channels based on the DS bonding context, TDD duty cycle, and PHY DS buffer depth alerts.

* * * * *